(12) United States Patent
Ziemkowski et al.

(10) Patent No.: US 7,639,934 B2
(45) Date of Patent: Dec. 29, 2009

(54) IMAGE STABILIZING IN CAMERAS (75) Inventors: Ted Ziemkowski, Fort Collins, CO (US); David Campbell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 11/477,034

(22) Filed: Jun. 28, 2006

(65) Prior Publication Data

US 2008/0002957 A1   Jan. 3, 2008

(51) Int. Cl.
*G03B 17/00* (2006.01)
*H04N 5/228* (2006.01)
*H04N 3/16* (2006.01)
*H04N 5/257* (2006.01)

(52) U.S. Cl. .............. 396/55; 348/208.99; 348/208.4; 348/208.12

(58) Field of Classification Search ............ 396/79, 396/118, 55; 348/208.99, 208.4, 208.7, 208.12, 348/255
See application file for complete search history.

(56) References Cited

U.S. PATENT DOCUMENTS

| 5,107,293 | A | 4/1992 | Sekine et al. |
| 5,561,498 | A | 10/1996 | Sekine et al. |
| 5,678,067 | A | 10/1997 | Kitagawa et al. |
| 5,699,112 | A | 12/1997 | Bacs, Jr. |
| 5,838,374 | A * | 11/1998 | Kikuchi ............... 348/351 |
| 5,995,758 | A | 11/1999 | Tyler |
| 6,170,331 | B1 | 1/2001 | Smith |
| 6,191,813 | B1 | 2/2001 | Fujisaki et al. |
| 6,694,096 | B1 | 2/2004 | Imada |
| 7,007,888 | B2 | 3/2006 | Brunson et al. |
| 7,483,056 | B2 * | 1/2009 | Shinohara et al. ....... 348/208.7 |
| 2002/0028071 | A1 * | 3/2002 | Molgaard ............... 396/53 |
| 2004/0212699 | A1 | 10/2004 | Molgaard |
| 2005/0030409 | A1 | 2/2005 | Matherson et al. |
| 2006/0018643 | A1 | 1/2006 | Stavely et al. |
| 2006/0177208 | A1 * | 8/2006 | Ito et al. ............... 396/55 |
| 2006/0257128 | A1 * | 11/2006 | Ishito et al. ............ 396/55 |
| 2007/0014551 | A1 * | 1/2007 | Fujisawa et al. ........ 396/20 |

FOREIGN PATENT DOCUMENTS

WO   WO 2006/051525   * 5/2006

* cited by examiner

*Primary Examiner*—Melissa J Koval (57) ABSTRACT

Image stabilizing in cameras is disclosed. In an exemplary implementation, a camera system may comprise an image sensor for collecting image data during use, and a motion sensor generating at least camera roll data. An image stabilizing subsystem may be operatively associated with the motion sensor and the image sensor. The image stabilizing subsystem moves the image sensor based on the camera roll data from the motion sensor and a correction factor based on a calibration procedure and stored in the image stabilizing subsystem to correct for at least camera roll during image exposure. Methods of calibrating a camera system for camera roll and of reducing blur from camera roll during use are also disclosed.

17 Claims, 6 Drawing Sheets

IMAGE STABILIZING IN CAMERAS

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease. During use, however, the user may shake or otherwise move the camera causing the image to appear blurred.

Tri-pods have long been used to stabilize a camera during image capture. More sophisticated mechanical devices which correct for camera motion including roll of the camera about the lens axis are also available. These mechanical devices operate by driving a platform that the camera is mounted to in a direction opposite the movement sensed by a sensor on the platform. While these work well, e.g., when mounted on aircraft, this is an expensive and bulky solution which is undesirable for use with personal or hand-held consumer cameras.

Image stabilizing subsystems for cameras are also commercially available which include logic for determining how much and in what direction (yaw or pitch) a camera is moving (e.g., based on input from a motion sensor such as a gyroscope). The logic moves either the entire camera lens, or an optical group in the camera lens in a direction opposite the camera movement during exposure of the image to stabilize the captured image. However, the nature of a camera lens only allows correction of yaw and pitch (e.g., movement about the x and y axes).

DETAILED DESCRIPTION

Systems and method described herein disclose image stabilizing in cameras. Exemplary camera systems have an image stabilizing subsystem which includes at least a motion sensor mounted to the image sensor which generates electrical signals indicating camera roll (and optionally yaw and pitch). These signals may be implemented by image stabilizing logic to generate a plurality of calibration constants during a calibration procedure. These calibration constants are stored in the camera system and accessed by the image stabilizing logic during use to determine a correction factor for moving the image capture device or image sensor during exposure of the image and correct for camera roll.

Figure 1:
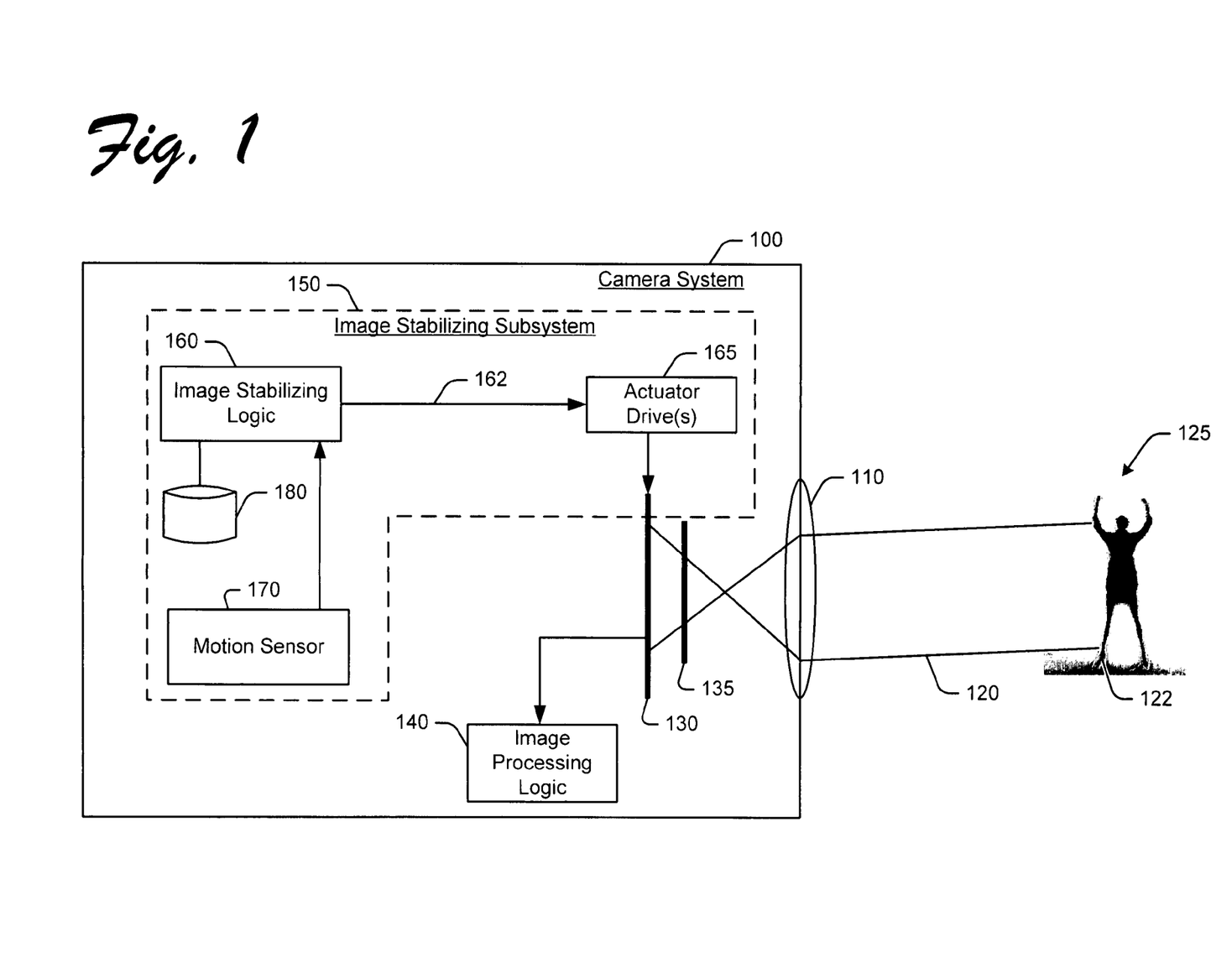
FIG. 1 is a block diagram of an exemplary camera system which may implement image stabilizing.

FIG. 1 is a block diagram of an exemplary camera system 100 which may implement image stabilizing. Camera systems may include still-photo and video cameras, now known or that may be later developed. Exemplary camera system 100 may include a lens 110 positioned in the camera system 100 to focus light 120 reflected from one or more objects 122 in a scene 125 onto an image capture device or image sensor 130 when a shutter 135 is open (e.g., for image exposure). Exemplary lens 110 may be any suitable lens which focuses light 120 reflected from the scene 125 onto image sensor 130.

Exemplary image sensor 130 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 130 may include, but is not limited to, a charge-coupled device (CCD), or a complementary metal oxide semiconductor (CMOS) sensor.

Camera system 100 may also include image processing logic 140. In digital cameras, the image processing logic 140 receives electrical signals from the image sensor 130 representative of the light 120 captured by the image sensor 130 during exposure to generate a digital image of the scene 125.

Shutters, image sensors, and image processing logic, such as those illustrated in FIG. 1, are well-understood in the camera and photography arts. These components may be readily provided for camera system 100 by those having ordinary skill in the art after becoming familiar with the teachings herein, and therefore further description is not necessary.

An exemplary image stabilizing subsystems 150 for use with the camera system 100 may include image stabilizing logic 160 and one or more actuator drive 165. The image stabilizing logic 160 determines how much and in what direction a camera is moving or shaking (e.g., based on input from a motion sensor 170 such as a gyroscope), and determines a correction factor to move the image sensor 130 during at least part of the exposure and correct the image for camera roll. The correction factor may be based on calibration data, e.g., calibration constants stored in a database, data store or other suitable data structure 180.

The image stabilizing logic 160 generates one or more image stabilizing signals (indicated by arrow 162) for the actuator drive 165. In response, actuator drive 165 causes the image sensor 130 to move in a direction which corrects for camera roll during all, or part of the exposure period. Optionally, actuator drive 165 may also move the lens 110 and/or other optical element(s) including the image sensor 130, e.g., to correct for yaw and/or pitch. In any event, the control signal(s) 162 indicates how to move the image sensor 130 and/or other optical element(s) for image stabilizing operations.

The control signal(s) 162 may identify the amount of movement and/or how the movement should be introduced. For example, the control signal(s) 162 may identify which optical element(s) should be moved or shifted, to what degree the optical element(s) should be moved or shifted, and/or start/stop/duration time for moving or shifting the optical element(s). It is noted that the image stabilizing signal(s) 162 may identify different optical element(s) for moving, and/or result in moving those optical element(s) different degrees (e.g., in different directions, at different frequencies, and/or at different times) for the separate purposes of stabilizing roll, pitch, and/or yaw.

It is also noted that amount and time of movement or shifting will depend at least to some extent on one or more design considerations, such as, e.g., which of the optical element(s) is being moved or shifted. For example, the amount of movement or shifting may be a fraction of a pixel or more for all or a portion of the exposure time, and is based on the amount of movement desired for stabilizing the image.

Before continuing, it is noted that the camera system 100 shown and described above with reference to FIG. 1 is merely exemplary of a camera system which may implement image stabilizing. The systems and methods described herein are not intended to be limited only to use with the camera system 100. Other embodiments of camera systems which may implement image stabilizing for cameras are also contemplated.

Figure 2A:
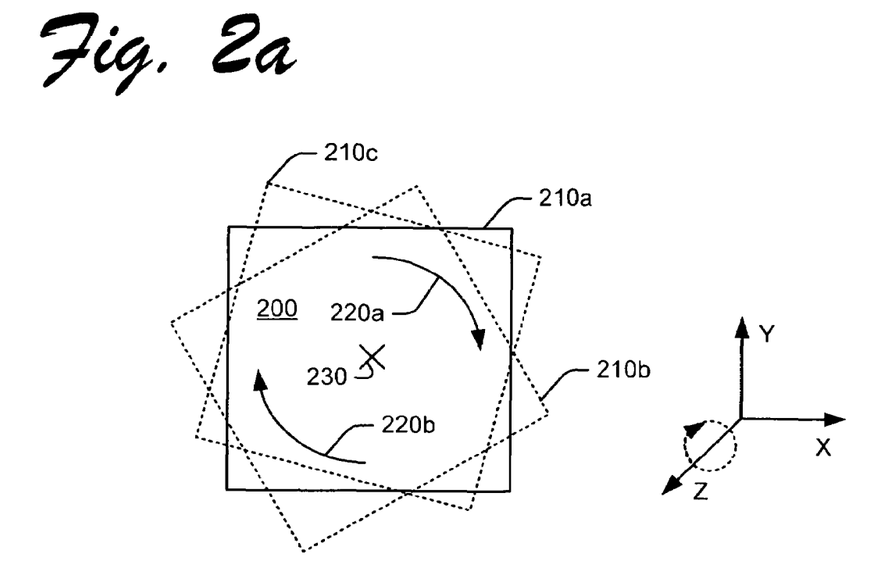
FIG. 2 is an illustration of exemplary camera roll, wherein (a) the roll is about concentric axes, and (b) the camera roll is about non-concentric axes.

FIG. 2 is an illustration of exemplary camera roll, wherein (a) the camera roll is about concentric axes, and (b) the camera roll is about non-concentric axes. In FIG. 2a, an image 200 is illustrated as it may be captured by an image sensor (e.g., the image sensor 130 in FIG. 1) in a stationary position 210a. That is, the camera system is not experiencing any roll about the z-axis.

During operation, however, the camera system may move or "roll" about the z-axis. This camera roll is illustrated by arrows 220a and 220b in FIG. 2a, and results in the image 200 shifting as illustrated by positions 210b and 210c. If camera roll occurs along concentric axes 230 (e.g., the image sensor axis, motion sensor axis, and camera system axis are aligned with one another), the resulting blur in the image 200 may be corrected (e.g., reduced or altogether prevented) by moving the image sensor in a direction opposite the camera roll. The direction, duration, and magnitude of this correction are proportional to the direction, duration, and magnitude of the camera roll and may be expressed as a "correction factor."

Figure 2B:
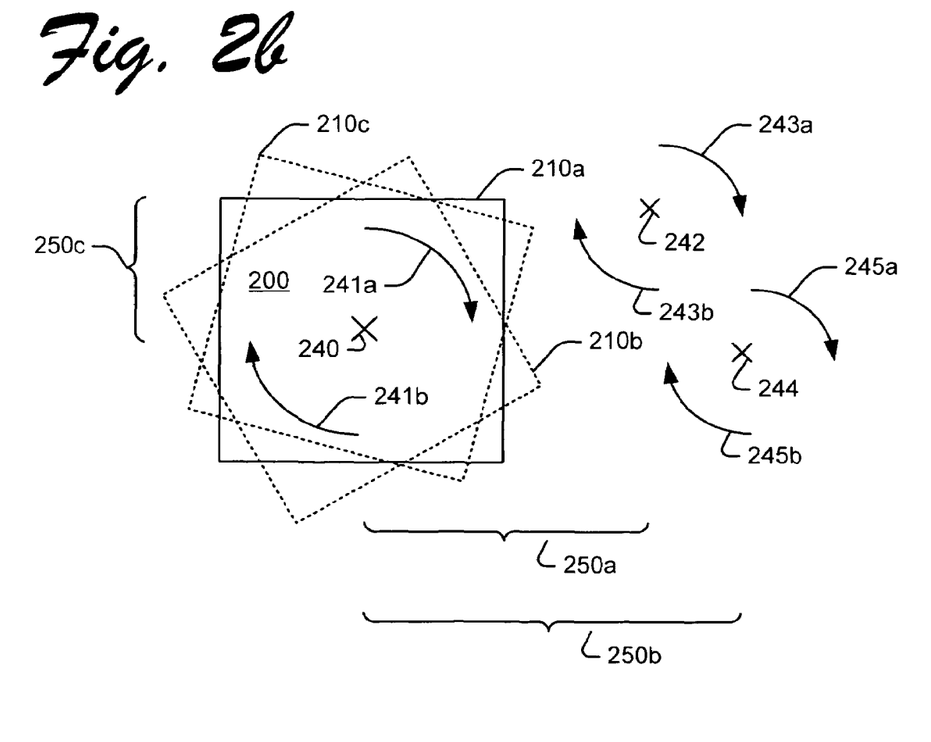

However, camera roll may occur along one or more non-concentric axes. For purposes of illustration, the camera system may experience camera roll about three non-concentric axes. In this example, the image sensor and motion sensor are installed in the camera system along separate axes 240, 242, e.g., due to packaging constraints within the camera system housing. In addition, the camera system may also roll about the user's arm or elbow (axis 244) during use. Camera roll about image sensor axis 240 is illustrated by arrows 241a, 241b, camera roll about motion sensor axis 242 is illustrated by arrows 243a, 243b, and camera roll about user axis 244 is illustrated by arrows 245a, 245b.

If camera roll is experienced along one or more non-concentric axes (e.g., axes 240-242), the resulting blur in the image 200 may still be corrected by moving the image sensor in a direction opposite the camera roll. However, the direction, duration, and magnitude of this correction factor is not necessarily directly proportional to the direction, duration, and magnitude of the camera roll. The correction factor may need to be adjusted for the vertical and/or horizontal offset between one or more of the axes 240, 241, and 242.

Horizontal offset is illustrated in FIG. 2b by bracket 250a between axes 240 and 242 and bracket 250b between axes 240 and 244. Vertical offset is illustrated in FIG. 2b by bracket 250c between axes 240 and 242. In this example, there is no vertical offset between axes 240 and 244. Calibration techniques may be implemented to correct for offset in either or both the horizontal and vertical directions, as will be described in more detail below with reference to FIG. 3.

Before continuing, it is noted that one or more axis may be concentric and/or other axis may be non-concentric during operation. Calibration techniques described herein may be configured for all concentric axes, all non-concentric axes, and/or a mix of each. The determination as to how many offsets to calibrate the camera system for may depend at least to some extent on design considerations, such as, but not limited to, the relative positioning of the image sensor and the motion sensor, the degree of blur introduced by roll about each axis, and the cost of calibrating a camera system for camera roll about different axes.

FIG. 3 is an illustration of exemplary camera roll and corresponding output by a motion sensor which may be implemented for calibrating a camera system for image stabilizing, wherein (a) the camera roll is about concentric axes, and (b) the camera roll is about non-concentric axes.

During a calibration procedure, the camera system may be connected to a moveable platform (not shown) which can be rotated about the z-axis. This configuration enables the camera system to experience known camera roll during the calibration procedure. The camera system may also be connected to an external computing device (e.g., a desktop or laptop computer) for the calibration procedure. The external computing device receives output from the camera system's motion sensor and data for the known camera roll. Alternatively, a processor provided in the camera system itself may be used for the calibration procedure (e.g., instead of an external computing device).

Figure 3A:
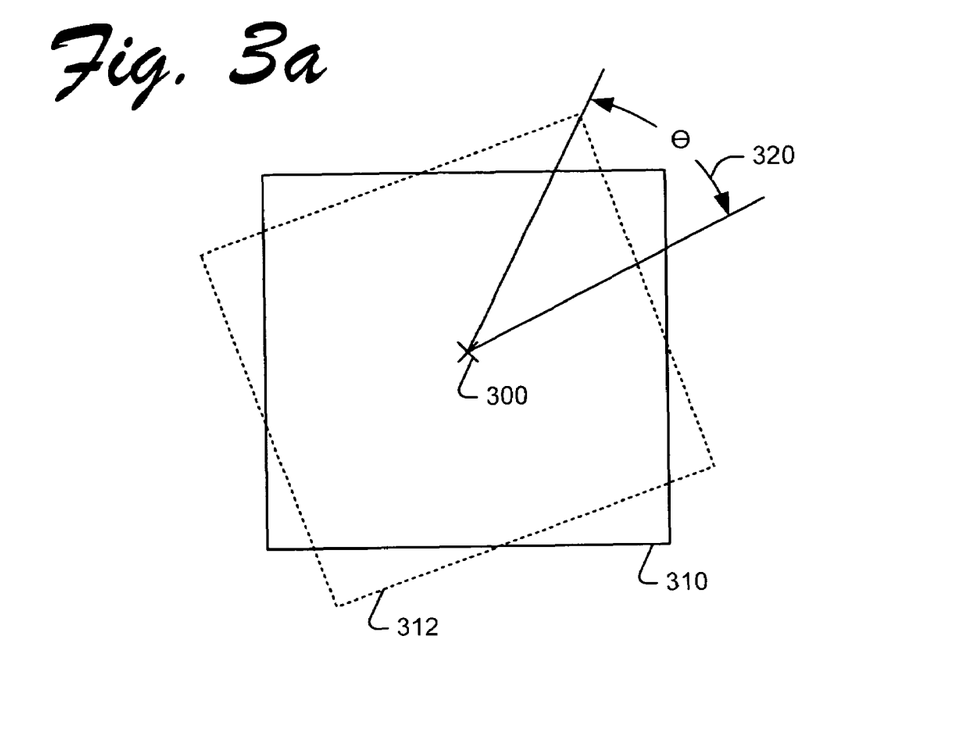
FIG. 3 is an illustration of exemplary camera roll and corresponding output by a motion sensor which may be implemented for calibrating a camera system for image stabilizing, wherein (a) the camera roll is about concentric axes, and (b) the camera roll is about non-concentric axes.

In the example illustrated in FIG. 3a, the camera system may be moving or "rolling" about concentric axes 300 from position 310 to position 312 through angle 320 (e.g., angle θ) for some Δt (e.g., time t1 to t2). During this time (Δt), the camera system's motion sensor may generate output (e.g., a voltage signal) indicative of the detected motion. Diagram 350 shows an exemplary output signal 355 corresponding to the known camera roll.

The data gathered during the calibration procedure may be implemented by the external computing device to determine a calibration constant and corresponding correction factor. By way of example, the calibration constant may be expressed as follows:

$$K = \frac{\Delta V}{\Delta \theta}$$

where:
K=calibration constant;
ΔV=change in voltage during delta time; and
Δθ=known camera movement.

The corresponding correction factor may include a direction duration, and magnitude for moving the image sensor to correct (or counteract) the effect of the known camera roll. The calibration constants (K) and corresponding correction factors may be stored in the camera system (e.g., in a database, data store, or other suitable data structure), and then implemented by the image stabilizing logic to reduce or altogether eliminate blur caused by camera roll during use (e.g., by a user taking pictures).

For purposes of illustration, the motion sensor may generate output of ΔV during Δt. Image stabilizing logic identifies the calibration constant (K) and determines the corresponding correction factor. The correction factor may then be implemented to move the image sensor during at least part of the exposure to reduce or altogether eliminate the effect of camera roll.

Figure 3B:
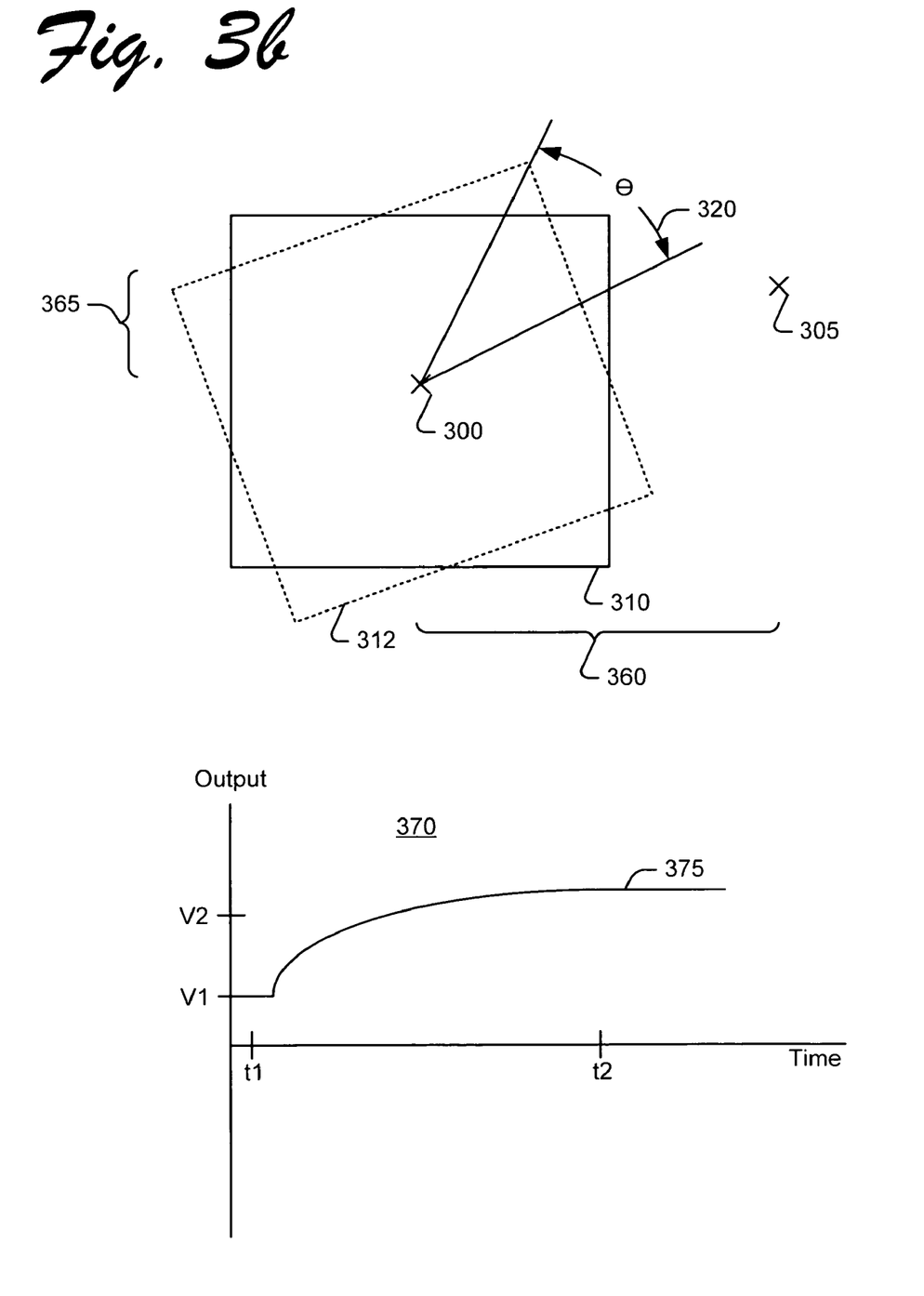

In the example illustrated in FIG. 3b, the camera system may be moving or "rolling" about non-concentric axes 300, 305 which include both a horizontal offset illustrated by bracket 360 and a vertical offset illustrated by bracket 365. Again, the image sensor is illustrated as moving from position 310 to position 312 through angle 320 (e.g., angle θ) for some Δt (e.g., time t1 to t2). The camera system's motion sensor may generate an output signal 375 (e.g., a voltage signal) indicative of the motion detected by the motion sensor, as shown in diagram 370.

In this example, the data gathered during the calibration procedure may include not only the known rotational data (e.g., angle θ), but may also include offset distances (e.g., illustrated by brackets 360 and 365). This data may be implemented by the external computing device to determine a calibration constant and corresponding correction factor. The calibration constants and corresponding correction factors may be stored in the camera system, and then implemented by the image stabilizing logic during operation of the camera system to reduce or altogether eliminate the effects of camera roll during use, e.g., by generating a control signal for the actuator drive to move the image sensor during at least part of the exposure if the camera is experiencing roll that would otherwise cause unacceptable blur.

It is noted that the calibration constant and correction factor is not limited to a single sampling, as illustrated in FIGS. 3a and 3b. Multiple samplings (e.g., Δt and/or ΔV) may be implemented during the calibration procedure.

Figure 4:
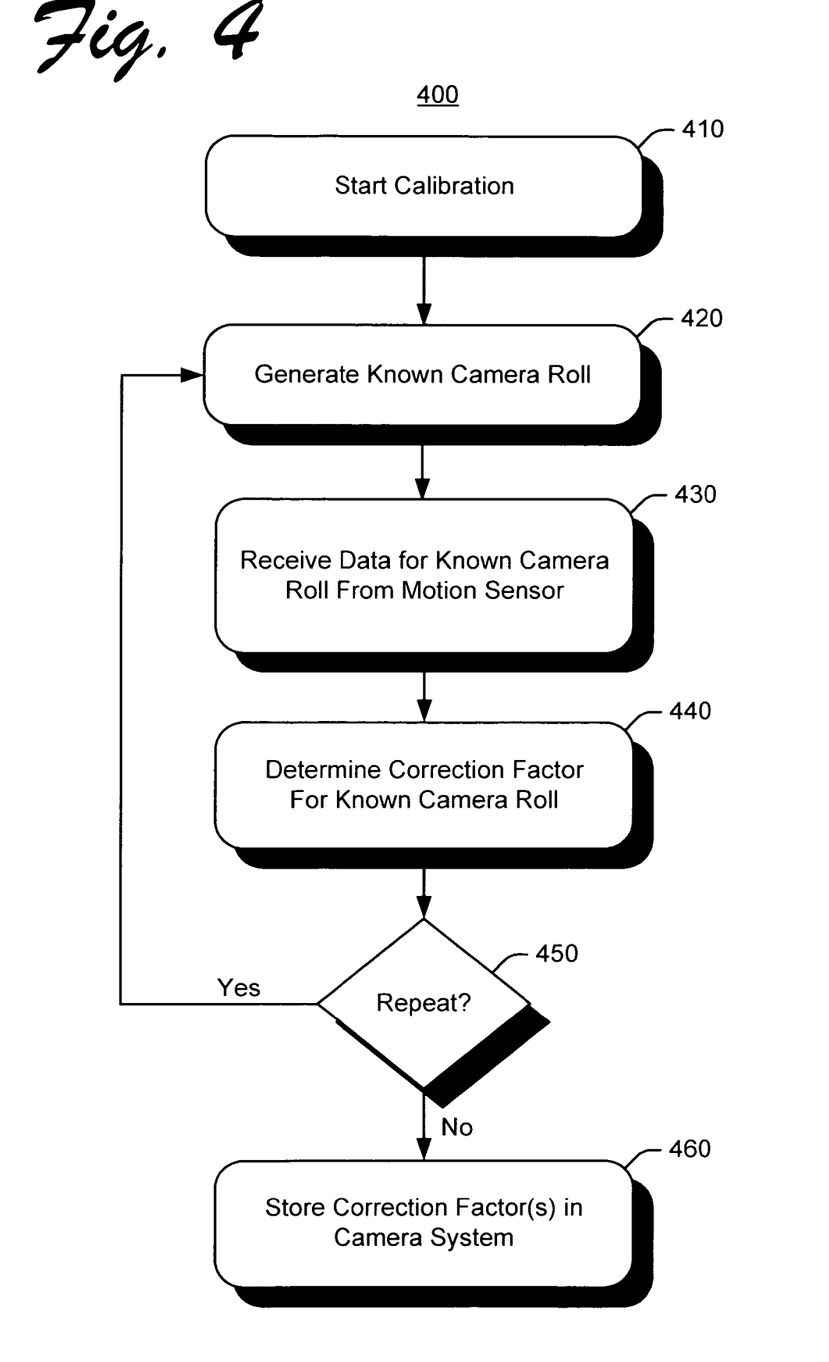
FIG. 4 is a flowchart illustrating exemplary operations which may be implemented during calibration for image stabilizing in cameras.
Figure 5:
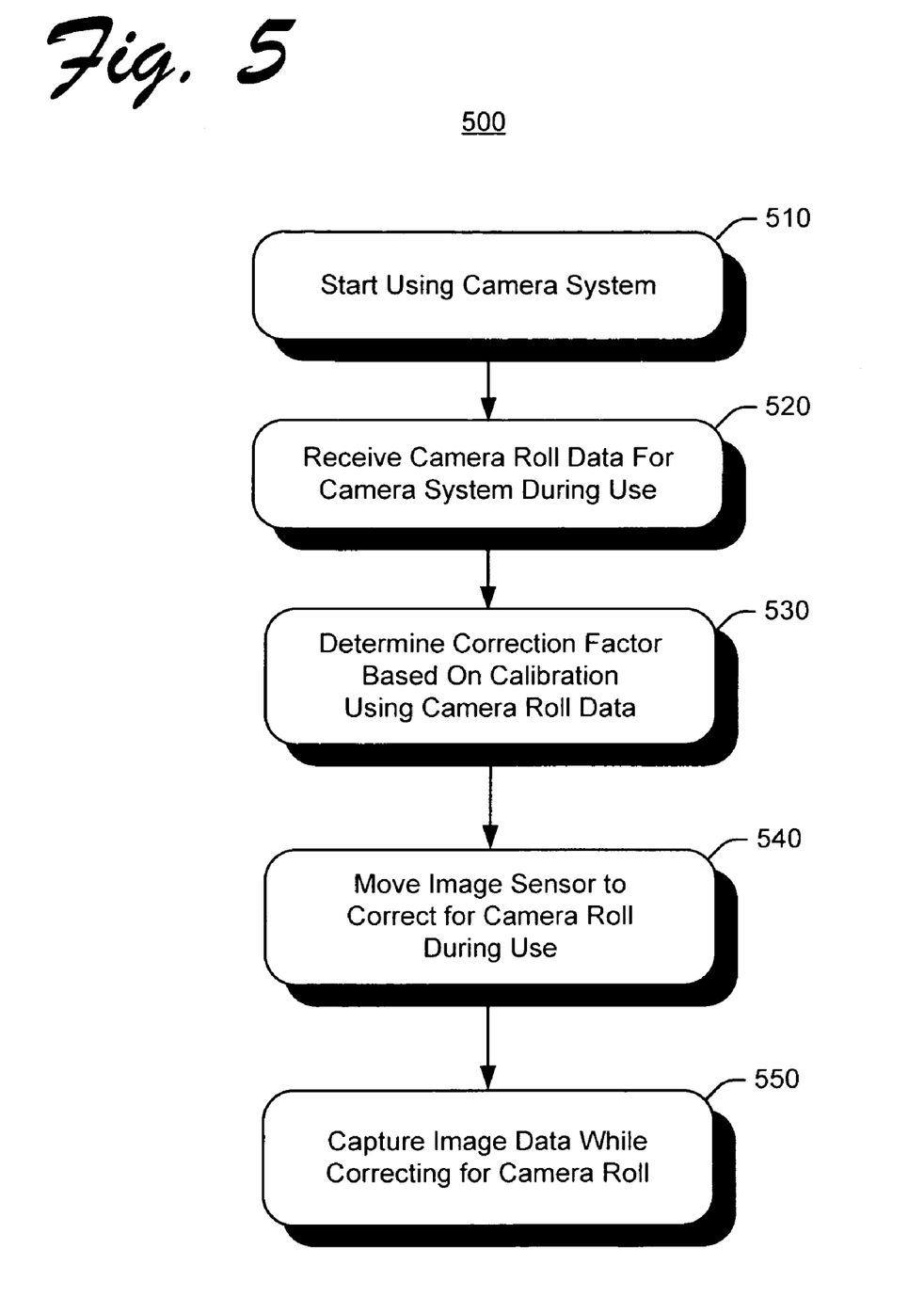
FIG. 5 is a flowchart illustrating exemplary operations which may be implemented during camera use for image stabilizing.

FIGS. 4 and 5 are flowcharts illustrating exemplary operations which may be implemented for image stabilizing in cameras. The operations may be embodied as logic instructions on one or more computer-readable medium. When executed on a processor, the logic instructions implement the described operations. In an exemplary implementation, the components and connections depicted in the figures may be used for image stabilizing in cameras.

FIG. 4 is a flowchart illustrating exemplary operations 400 which may be implemented during calibration for image stabilizing in cameras. In operation 410, the calibration procedure starts. For example, the camera system may be connected to a moving platform which subjects the camera system to known camera roll. A computing device generates calibration data (e.g., a calibration constant and corresponding correction factor) based on known camera roll.

In operation 420, known camera roll is generated for the camera system. In operation 430, data for the known camera roll is received from the camera system's motion sensor. For example, the data may be received at the external computing device. In operation 440, a correction factor is determined for the known camera roll. In an exemplary embodiment, the external computing device may also be used to determine the correction factor.

In operation 450, a determination is made whether to repeat the operations. If additional data is needed for calibrating the camera system, operations may return to operation 420 to continue generating known camera roll for the camera system and determining corresponding correction factors. If no additional data is needed to calibrate the camera system, in operation 460 the correction factors may be stored in the camera system. For example, the correction factors may be transferred from the external computing device to memory in the camera system for access by image stabilizing logic.

It is noted that storing the correction factor (operation 460) may occur immediately after determining the correction factor (operation 440), or after all correction factors have been determined for the camera system. It is also noted that any suitable criteria may be used for making the determination whether to continue calibrating the camera system in operation 450. For example, the camera system may be calibrated for some or all possible types of camera roll. Other operations may also be implemented, such as. e.g., statistical modeling or extrapolation to determine additional calibration data for anticipated camera roll.

It is also noted that each camera system does not need to be individually calibrated. In exemplary embodiments, a single camera system may be calibrated and the calibration data used in a plurality of camera systems.

FIG. 5 is a flowchart illustrating exemplary operations 500 which may be implemented during camera use for image stabilizing in cameras. In operation 510, the camera system may be started, such as, by a user desiring to take a photograph. In operation 520, camera roll data for the camera system is received during use. For example, camera roll data may be received from a motion sensor in the camera system before and/or during image exposure. In operation 530, a correction factor is determined from the calibration constant stored in the camera system using the actual camera roll data received during operation 520.

In operation 540, the image sensor may be moved to correct for camera roll during use. Optionally, other optical elements in the camera system may also be moved. For example, the lens may be rotated to correct for camera yaw and pitch. In operation 550, the image data is captured while correcting for camera roll so as to reduce or altogether eliminate blur due to camera roll.

The operations shown and described herein are provided to illustrate exemplary implementations of image stabilizing in cameras. The operations are not limited to the ordering shown. Still other operations may also be implemented.

It is noted that the exemplary embodiments shown and described are provided for purposes of illustration and are not intended to be limiting. Still other embodiments of image stabilizing in cameras are also contemplated.

The invention claimed is:

1. A camera system comprising:
an image sensor for collecting image data during use;
a motion sensor generating at least camera roll data; and
an image stabilizing subsystem operatively associated with the motion sensor and the image sensor, the image stabilizing subsystem moving the image sensor based on the camera roll data from the motion sensor and a correction factor, the correction factor determined using a calibration constant determined using a calibration procedure based on known camera roll and stored in the image stabilizing subsystem to correct for at least camera roll during image exposure.

2. The camera system of claim 1, wherein the correction factor includes direction, duration, and magnitude data for moving the image sensor.

3. The camera system of claim 1, wherein the image stabilizing subsystem moves the image sensor at least to correct for camera roll about concentric axes.

4. The camera system of claim 1, wherein the image stabilizing subsystem moves the image sensor to correct for camera roll about at least one non-concentric axis.

5. The camera system of claim 4, wherein the at least one non-concentric axis is selected from the group consisting of an image sensor axis, a motion sensor axis, and a user axis.

6. The camera system of claim 4, wherein the at least one non-concentric axis is offset at least a vertical distance from another axis for camera roll.

7. The camera system of claim 4, wherein the at least one non-concentric axis is offset at least a horizontal distance from another axis for camera roll.

8. The camera system of claim 1, further comprising an external computing device for receiving known camera roll data and corresponding output from the motion sensor during a calibration procedure, the external computing device generating a plurality of correction factors for use by the image stabilizing subsystem.

9. A method of reducing blur from camera roll during use, comprising:
   receiving camera roll data for a camera system during use;
   determining a correction factor based at least on the camera roll data and a prior calibration procedure based on known camera roll;
   determining the correction factor from a calibration constant identified during the prior calibration procedure; and
   moving an image sensor using the correction factor to reduce blur introduced during at least part of the image exposure.

10. The method of claim 9, further comprising identifying duration, direction, and magnitude data for moving the image sensor.

11. The method of claim 9, further comprising moving the image sensor to correct for camera roll about concentric z-axes.

12. The method of claim 9, further comprising moving the image sensor to correct for camera roll about at least one non-concentric z-axis.

13. The method of claim 12, wherein the at least one non-concentric axis is offset both vertically and horizontally from another z-axis.

14. A method of calibrating a camera system for camera roll, comprising:
   generating known camera roll data for the camera system;
   receiving actual camera roll data corresponding to the known camera roll data from a motion sensor in the camera system;
   determining a correction factor for the known camera roll data based at least in part on the known camera roll data and actual camera roll data;
   determining a calibration constant and associating the calibration constant with the correction factor; and
   storing the correction factor in the camera system to correct for camera roll during at least part of an image exposure operation.

15. The method of claim 14, further comprising identifying direction, duration, and magnitude data for moving an image sensor of the camera system.

16. The method of claim 14, wherein determining the correction factor is based on camera roll about concentric z-axes, 17. The method of claim 14, wherein determining the correction factor is based on camera roll about at least one non-concentric z-axis.

* * * * *

UNITED STATES PATENT AND TRADEMARK OFFICE
CERTIFICATE OF CORRECTION

PATENT NO. : 7,639,934 B2 Page 1 of 1
APPLICATION NO. : 11/477034
DATED : December 29, 2009
INVENTOR(S) : Ted Ziemkowski et al.

It is certified that error appears in the above-identified patent and that said Letters Patent is hereby corrected as shown below:

In column 1, line 39, delete "the roll" and insert -- the camera roll --, therefor.

In column 8, line 19, in Claim 16, delete "z-axes," and insert -- z-axes. --, therefor.

Signed and Sealed this

Thirteenth Day of April, 2010

David J. Kappos
*Director of the United States Patent and Trademark Office*